(12) United States Patent
Liu

(10) Patent No.: US 12,155,500 B2
(45) Date of Patent: Nov. 26, 2024

(54) REMOTE CONTROL METHOD AND APPARATUS, ELECTRONIC DEVICE AND MEDIUM

(71) Applicant: Beijing Baidu Netcom Science Technology Co., Ltd., Beijing (CN)

(72) Inventor: Zhiyu Liu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 107 days.

(21) Appl. No.: 18/099,458

(22) Filed: Jan. 20, 2023

(65) Prior Publication Data
US 2023/0344669 A1   Oct. 26, 2023

(30) Foreign Application Priority Data
Apr. 22, 2022   (CN) .......................... 202210432067.7

(51) Int. Cl.
*H04L 12/28*   (2006.01)
*G08C 17/02*   (2006.01)
(Continued)

(52) U.S. Cl.
CPC .......... *H04L 12/2816* (2013.01); *G08C 17/02* (2013.01); *G10L 15/1822* (2013.01);
(Continued)

(58) Field of Classification Search
None
See application file for complete search history.

(56) References Cited

U.S. PATENT DOCUMENTS

| | | | |
|---|---|---|---|
| 10,115,395 B2 * | 10/2018 | Heo | ...................... G10L 21/028 |
| 10,119,714 B2 * | 11/2018 | Amer | .................. H04L 67/1001 |

(Continued)

FOREIGN PATENT DOCUMENTS

| | | |
|---|---|---|
| CN | 202720774 U | 2/2013 |
| CN | 104809865 A | 7/2015 |

(Continued)

OTHER PUBLICATIONS

Office Action issued on Apr. 28, 2023 by the CIPO in the corresponding Patent Application No. 202210432067.7, with English translation.

(Continued)

*Primary Examiner* — Muhammad Adnan
(74) *Attorney, Agent, or Firm* — Norton Rose Fulbright US LLP; James R. Crawford

(57) ABSTRACT

Provided are a remote control method and apparatus, an electronic device and a medium, which relate to the field of communications and in particular, to the fields of smart home, smart life, Internet of things and cloud service. The specific implementation is as follows: acquiring a remote control instruction from a first smart device, wherein the remote control instruction is generated according to a control operation on a second remote controller and transmitted to the first smart device through a second smart device, and the first smart device is connected to a first remote controller; and controlling a control object of the first remote controller according to the remote control instruction.

4 Claims, 4 Drawing Sheets

(51) Int. Cl.
  *G10L 15/18* (2013.01)
  *G10L 15/22* (2006.01)
  *H04W 4/80* (2018.01)

(52) U.S. Cl.
  CPC .............. *G10L 15/22* (2013.01); *H04W 4/80* (2018.02); *G10L 2015/223* (2013.01); *H04L 2012/2841* (2013.01)

(56) References Cited

U.S. PATENT DOCUMENTS

| | | | | |
|---|---|---|---|---|
| 2007/0043843 | A1* | 2/2007 | Devereaux | H04N 7/152 709/223 |
| 2013/0162412 | A1* | 6/2013 | Yu | G08C 23/04 340/12.5 |
| 2015/0358175 | A1* | 12/2015 | Lee | G05B 15/02 700/275 |
| 2016/0227150 | A1* | 8/2016 | Sun | H04N 21/42204 |
| 2017/0125035 | A1* | 5/2017 | Gao | G08C 23/02 |
| 2019/0075269 | A1* | 3/2019 | Nashida | H04N 21/44218 |
| 2019/0387093 | A1* | 12/2019 | Yu | G06F 3/1204 |
| 2021/0007202 | A1* | 1/2021 | Guo | H05B 47/12 |
| 2021/0012775 | A1* | 1/2021 | Kang | G10L 15/083 |
| 2021/0303253 | A1* | 9/2021 | Hwang | G06Q 20/02 |
| 2021/0358239 | A1* | 11/2021 | Key | H04B 5/77 |
| 2022/0239518 | A1* | 7/2022 | Browne, Jr. | H04L 67/12 |
| 2022/0245627 | A1* | 8/2022 | Foster, Jr. | G06Q 20/3224 |
| 2023/0126305 | A1* | 4/2023 | Kim | G06F 3/167 704/275 |
| 2023/0132079 | A1* | 4/2023 | Amer | F24F 11/56 |
| 2024/0105164 | A1* | 3/2024 | Zhang | H04L 12/2816 |

FOREIGN PATENT DOCUMENTS

| | | |
|---|---|---|
| CN | 104977904 A | 10/2015 |
| CN | 106297263 A | 1/2017 |

OTHER PUBLICATIONS

Search Report issued on Apr. 22, 2023 by the CIPO in the corresponding Patent Application No. 202210432067.7, with English translation.

* cited by examiner

REMOTE CONTROL METHOD AND APPARATUS, ELECTRONIC DEVICE AND MEDIUM

CROSS-REFERENCE TO RELATED APPLICATION

This application claims priority to Chinese Patent Application No. CN202210432067.7 filed on Apr. 22, 2022, the disclosure of which is incorporated herein by reference in its entirety.

TECHNICAL FIELD

The present disclosure relates to the field of communications, in particular, to the fields of smart home, smart life, Internet of things and cloud service, and specifically, to a remote control method and apparatus, an electronic device and a medium.

BACKGROUND

With the development of intelligence, the current appliance devices such as televisions, air conditioners and washing machines become more and more intelligent and more and more multi-functional, and thus settings and controls of appliance devices increasingly grow.

At present, the settings and controls of appliance devices are usually achieved by users through a remote controller at a close distance.

SUMMARY

The present disclosure provides a remote control method and apparatus, an electronic device and a medium for increasing the effective distance for controlling a control object.

According to an aspect of the present disclosure, a remote control method is provided. The method includes the steps described below.

A remote control instruction is acquired from a first smart device, where the remote control instruction is generated according to a control operation on a second remote controller and transmitted to the first smart device through a second smart device, and the first smart device is connected to a first remote controller.

A control object of the first remote controller is controlled according to the remote control instruction.

According to another aspect of the present disclosure, a remote control method is provided. The method includes the steps described below.

A remote control instruction is acquired from a second smart device, where the remote control instruction is generated according to a control operation on a second remote controller, the second remote controller is connected to the second smart device, and the second smart device is connected to a first smart device.

The remote control instruction is transmitted to a first remote controller connected to the first smart device so that the first remote controller controls a control object of the first remote controller according to the remote control instruction.

According to another aspect of the present disclosure, a remote control apparatus is provided. The apparatus includes a first instruction acquisition module and an object control module.

The first instruction acquisition module is configured to acquire a remote control instruction from a first smart device, where the remote control instruction is generated according to a control operation on a second remote controller and transmitted to the first smart device through a second smart device, and the first smart device is connected to a first remote controller.

The object control module is configured to control a control object of the first remote controller according to the remote control instruction.

According to another aspect of the present disclosure, a remote control apparatus is provided. The apparatus includes a second instruction acquisition module and an instruction transmission module.

The second instruction acquisition module is configured to acquire a remote control instruction from a second smart device, where the remote control instruction is generated according to a control operation on a second remote controller, the second remote controller is connected to the second smart device, and the second smart device is connected to a first smart device.

The instruction transmission module is configured to transmit the remote control instruction to a first remote controller connected to the first smart device so that the first remote controller controls a control object of the first remote controller according to the remote control instruction.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure. In the drawings.

DETAILED DESCRIPTION

Example embodiments of the present disclosure, including details of embodiments of the present disclosure, are described hereinafter in conjunction with the drawings to facilitate understanding. The example embodiments are merely illustrative. Therefore, it is to be appreciated by those of ordinary skill in the art that various changes and modifications may be made to the embodiments described herein without departing from the scope and spirit of the present disclosure. Similarly, the description of well-known functions and constructions is omitted hereinafter for clarity and conciseness.

Current appliance devices have various functions and plentiful settings. However, some settings and controls of appliance devices are relatively complex and elusive, and when users unfamiliar with these settings and controls use appliance devices, they can't master these settings and controls well due to the limitation of the awareness level and familiarity, bringing great inconvenience to users.

At this point, the users can only seek help from appliance device manufacturers or others by means of video or speech to assist them in setting and controlling the appliance devices. However, at present, since the settings and controls of appliance devices are usually achieved by users through a remote controller at a close distance, the appliance device manufacturers or others can only give some guidance to the users, but cannot directly set or control the appliance devices, resulting in the relatively low setting and control efficiency of appliance devices. Therefore, a method for controlling appliance devices remotely is urgently needed.

Figure 1:
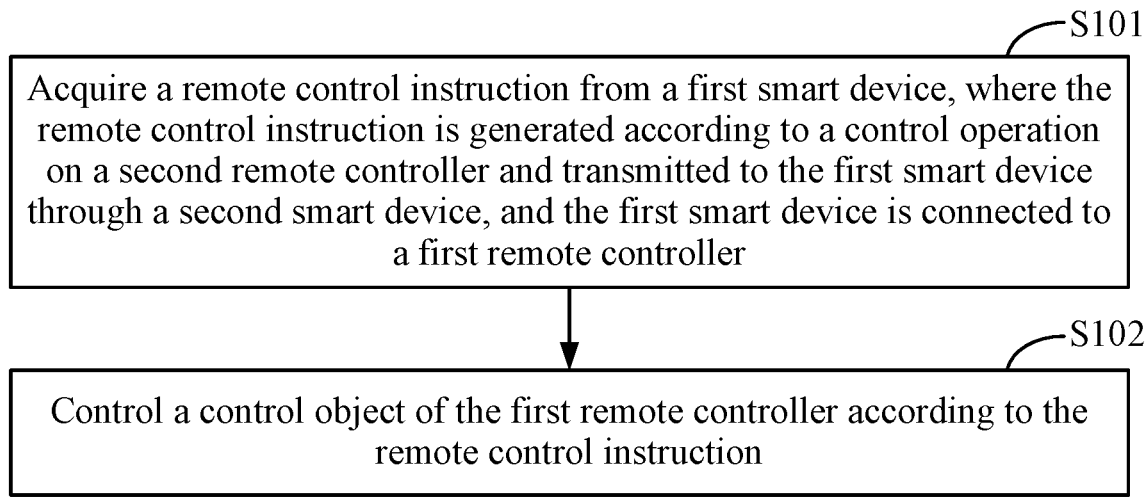
FIG. 1 is a flowchart of a remote control method according to an embodiment of the present disclosure.

FIG. 1 is a flowchart of a remote control method according to an embodiment of the present disclosure. This embodiment is applicable to the case of remotely controlling a control object. The method in this embodiment may be performed by a remote control apparatus provided by an embodiment of the present disclosure. The apparatus may be configured in a first remote controller, implemented by software and/or hardware and integrated into any electronic device having a computing capability.

As shown in FIG. 1, the remote control method provided in this embodiment may include steps S101 and S102.

In S101, a remote control instruction is acquired from a first smart device, where the remote control instruction is generated according to a control operation on a second remote controller and transmitted to the first smart device through a second smart device, and the first smart device is connected to a first remote controller.

The first smart device and the second smart device represent terminal devices equipped with a smart operating system, such as smartphones, smartwatches, smart bracelets, smart tablets and the like. The first smart device and the second smart device may have the same type, and for example, the first smart device and the second smart device are both smartphones. The first smart device and the second smart device may have different types, and for example, the first smart device is a smartphone while the second smart device is a smartwatch. The specific types of the first smart device and the second smart device are not limited to this embodiment. The first smart device is in a communication connection with the second smart device, and for example, the first smart device and the second smart device perform wireless communication through a Wireless Fidelity (Wi-Fi) network, a 4G network or a 5G network. The first smart device is disposed on a side close to the control object, and for example, when the control object is an appliance device, the first smart device may be a smart device held by the user who owns the appliance device. The second smart device is disposed on a side away from the control object, and for example, when the control object is an appliance device, the second smart device may be a smart device held by the maintenance personnel of the appliance device manufacturer.

Both the first remote controller and the second remote controller are equipped with a communication module and a processing module and have functions of data communication and data processing. The first remote controller is in a communication connection with the first smart device, and the second remote controller is in a communication connection with the second smart device. The first remote controller is disposed on a side close to the control object, and for example, when the control object is an appliance device, the first remote controller may be a remote controller held by the user who owns the appliance device. The second remote controller is disposed on a side away from the control object, and for example, when the control object is an appliance device, the second remote controller may be a remote controller held by the maintenance personnel of the appliance device manufacturer.

In an embodiment, the communication connection between the first smart device and the second smart device is pre-established. The remote person far away from the control object performs control operations on the second remote controller, and the control operations include, but are not limited to, touch operations and speech operations. For example, the remote person clicks the "Volume +", "Volume −", "Brightness +", "Brightness −", "Page Up", "Page Down", "Confirm" or "Cancel" button on the second remote controller. In another example, the remote person issues a speech instruction to the second remote controller, such as "increase the volume", "lower the volume", "increase the brightness", "lower the brightness", "previous page", "next page", "confirm" or "cancel".

The second remote controller generates a remote control instruction including a target instruction type according to the control operation of the remote personnel. For example, when the control operation is a touch operation, the second remote controller generates a target instruction type corresponding to the button touched by the remote person according to the touched button and generates a remote control instruction including the target instruction type. For example, if the remote person touches the "Volume +" button, the target instruction type generated by the second remote controller is a "volume increase instruction". In another example, when the control operation is a speech operation, the second remote controller performs semantic recognition on a speech instruction issued by the remote personnel, determines the control intention of the remote personnel, determines a target instruction type according to the control intention, and generates a remote control instruction including the target instruction type. For example, if the speech instruction of the remote person is "confirm", the target instruction type generated by the second remote controller is a "confirmation instruction".

The second remote controller transmits the remote control instruction to the second smart device, the second smart device transmits the remote control instruction to the first smart device, and the first smart device transmits the remote control instruction to the first remote controller.

The remote control instruction is acquired from the first smart device, laying a data foundation for the subsequent control of the control object by the first remote controller.

In S102, a control object of the first remote controller is controlled according to the remote control instruction.

The control object may be any electronic device having a data receiving function and a data processing function, such as a television, an air conditioner, a washing machine and other appliance devices. The specific type of the control object is not limited to this embodiment.

In an embodiment, the first remote controller parses the acquired remote control instruction, determines the target instruction type included in the remote control instruction, generates the control instruction according to the target instruction type, and transmits the control instruction to the control object. The control object receives the control instruction, recognizes the control instruction and performs the control operation corresponding to the target instruction type according to the recognition result. For example, when the target instruction type is the "volume increase instruction", the control object increases the volume of the audio played by the speaker. In another example, when the target instruction type is a "next page instruction", the control object performs the operation of jumping to the next page on the screen.

In the present disclosure, the remote control instruction is acquired from the first smart device, where the remote control instruction is generated according to the control operation on the second remote controller and transmitted to the first smart device through the second smart device, and the first smart device is connected to the first remote controller; and the control object of the first remote controller is controlled according to the remote control instruction, thereby increasing the effective distance for controlling the control object and achieving the effect of remotely controlling the control object. Further, since the remote person can directly control the control object, there is no need to guide the local person to control the control object by means of video or speech, thereby greatly improving the efficiency of controlling the control object.

Figure 2:
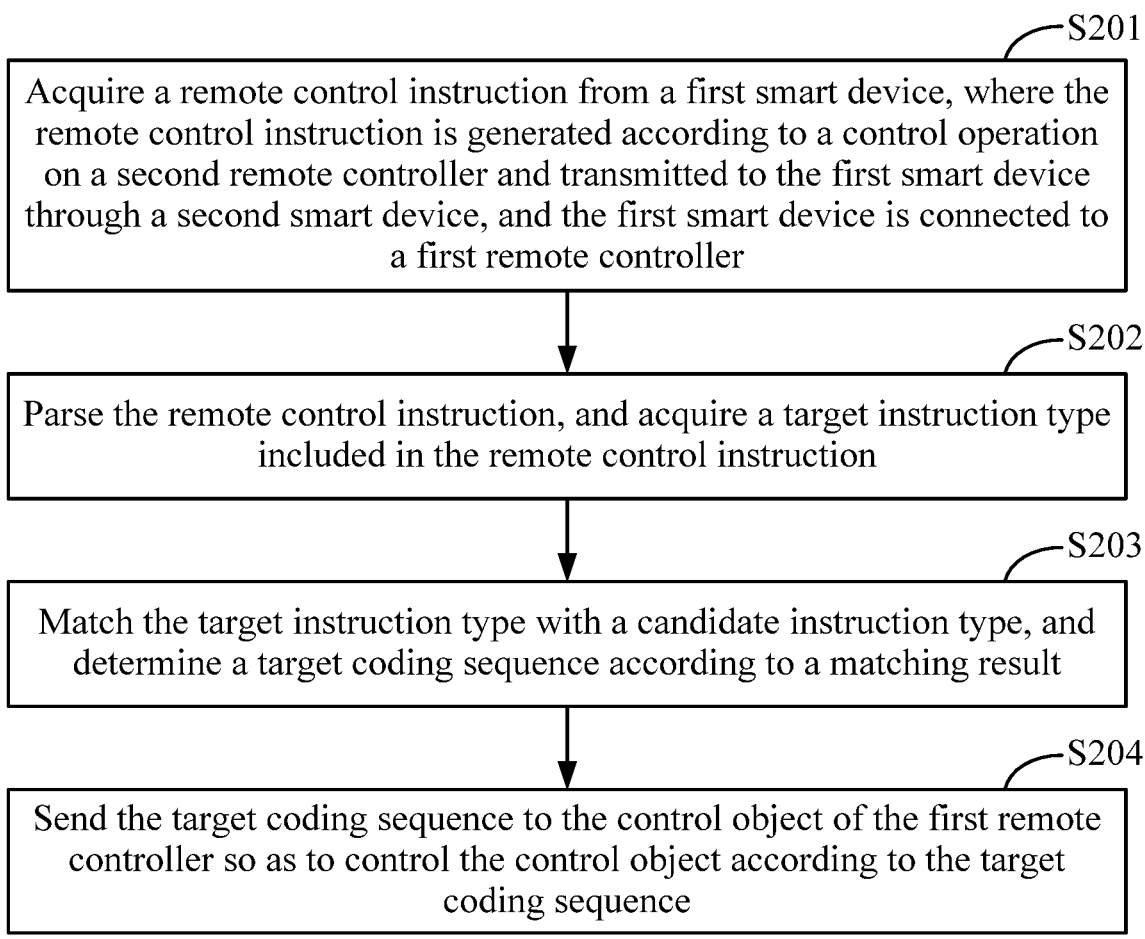
FIG. 2 is a flowchart of another remote control method according to an embodiment of the present disclosure.

FIG. 2 is a flowchart of another remote control method according to an embodiment of the present disclosure. This embodiment is an optimization and expansion of the preceding technical solution and can be combined with each preceding optional embodiment.

As shown in FIG. 2, the remote control method provided in this embodiment may include steps S201, S202, S203, and S204.

In S201, a remote control instruction is acquired from a first smart device, where the remote control instruction is generated according to a control operation on a second remote controller and transmitted to the first smart device through a second smart device, and the first smart device is connected to a first remote controller.

In S202, the remote control instruction is parsed, and a target instruction type included in the remote control instruction is acquired.

In an embodiment, the remote control instruction carries the target instruction type generated by the second remote controller. After the first remote controller acquires the remote control instruction, the first remote controller performs data parse on the remote control instruction and extracts the target instruction type included in the remote control instruction.

In S203, the target instruction type is matched with a candidate instruction type, and a target coding sequence is determined according to a matching result.

The association relationship between candidate instruction types and candidate coding sequences is pre-established in the first remote controller, that is, the candidate coding sequence uniquely corresponding to a candidate instruction type may be determined according to the candidate instruction type. The candidate coding sequence is an electrical signal used for distinguishing different instruction types.

In an embodiment, the first remote controller matches the target instruction type with the candidate instruction type and determines the target coding sequence from the candidate coding sequences according to the matching result and the association relationship between candidate instruction types and candidate coding sequences.

Optionally, S203 includes the steps described below.

The candidate instruction type matching the target instruction type is determined, and a candidate coding sequence associated with the candidate instruction type is taken as the target coding sequence.

For example, assuming that the target instruction type is the "volume increase instruction", according to the association relationship between candidate instruction types and candidate coding sequences, the candidate coding sequence associated with the candidate instruction type "volume increase instruction" is "010011100," and the candidate coding sequence "010011100" is taken as the target coding sequence corresponding to the target instruction type.

The candidate instruction type matching the target instruction type is determined, and the candidate coding sequence associated with the candidate instruction type is taken as the target coding sequence so that the effect of directly determining the target coding sequence according to the target instruction type is achieved without the operation of re-coding, thereby shortening the time required for the processing flow and laying the foundation for the subsequent generation of the wireless control signal.

In S204, the target coding sequence is sent to the control object of the first remote controller so as to control the control object according to the target coding sequence.

In an embodiment, the first remote controller generates the target coding sequence, amplifies the target coding sequence, and sends the amplified target coding sequence to the control object in a preset transmission manner. After the control object acquires the target coding sequence, the control object decodes the target coding sequence and performs the corresponding operation according to the decoding result.

The remote control instruction is parsed, the target instruction type included in the remote control instruction is acquired, the target instruction type is matched with the candidate instruction type, the target coding sequence is determined according to the matching result, and the target coding sequence is sent to the control object of the first remote controller so that the control object is controlled according to the target coding sequence. In this manner, the first remote controller can control the control object according to the remote control instruction generated by the second remote controller, thereby increasing the effective distance for controlling the control object by the second remote controller and achieving the effect of remotely controlling the control object.

On the basis of the preceding embodiments, optionally, the step where the target coding sequence is sent to the control object of the first remote controller includes the step described below.

The target coding sequence is sent to the control object using at least one of the following transmission manners: an infrared transmission manner, a Bluetooth transmission manner, an ultrasonic transmission manner, a Wireless Fidelity transmission manner or a mobile network transmission manner.

The infrared transmission manner represents a manner of transmitting the target coding sequence by means of infrared light. The Bluetooth transmission manner represents a manner of transmitting the target coding sequence by means of electromagnetic waves. The ultrasonic transmission manner represents a manner of transmitting the target coding sequence by means of mechanical waves. The Wireless Fidelity transmission manner is the Wi-Fi transmission manner. The mobile network transmission manner includes, but is not limited to, 3G network transmission, 4G network transmission and 5G network transmission.

In an embodiment, at least one of the infrared transmission manner, the Bluetooth transmission manner, the ultrasonic transmission manner, the Wireless Fidelity transmission manner or the mobile network transmission manner is selected as a target transmission manner according to the transmission manner supported by the control object, and the target coding sequence is sent to the control object using the target transmission manner.

For example, if the control object only supports infrared transmission, the first remote controller sends the target coding sequence to the control object using the infrared transmission manner; if the control object only supports Bluetooth transmission, the first remote controller sends the target coding sequence to the control object using the Bluetooth transmission manner; if the control object supports all the preceding transmission manners, the first remote controller sends the target coding sequence to the control object using at least one of the preceding transmission manners.

The target coding sequence is sent to the control object using at least one of the following transmission manners: the infrared transmission manner, the Bluetooth transmission manner, the ultrasonic transmission manner, the Wireless Fidelity transmission manner or the mobile network transmission manner, thereby expanding the application range of the control performed by the first remote controller and improving the redundancy of the control performed by the first remote controller. For example, when the control object is a conventional television, the first remote controller may perform the control using the infrared transmission manner; and when the control object is a smart Bluetooth television, the first remote controller may perform the control using the Bluetooth transmission manner.

On the basis of the preceding embodiments, optionally, after S201, the method further includes the steps described below.

The remote control instruction is parsed, and a target instruction type included in the remote control instruction is acquired; and a speech control instruction is generated according to the target instruction type, and the speech control instruction is played to the control object of the first remote controller so that the control object is controlled according to the speech control instruction.

In an embodiment, the remote control instruction carries the target instruction type generated by the second remote controller. After the first remote controller acquires the remote control instruction, the first remote controller performs data parse on the remote control instruction and extracts the target instruction type included in the remote control instruction. When the control object supports the speech recognition function, the first remote controller determines a target control text matching the target instruction type from the candidate control texts, converts the target control text into a speech control instruction through the text-to-speech (TTS) technology, and plays the speech control instruction to the control object of the first remote controller. For example, when the target instruction type is the "volume increase instruction", the speech control instruction may be "increase the volume" or "volume up".

After the control object collects the speech control instruction, the control object performs speech recognition on the speech control instruction and performs the control operation corresponding to the target instruction type according to the speech recognition result.

The remote control instruction is parsed, the target instruction type included in the remote control instruction is acquired, the speech control instruction is generated according to the target instruction type, and the speech control instruction is played to the control object of the first remote controller to control the control object according to the speech control instruction. In this manner, the first remote controller can control the control object in a manner of speech control according to the remote control instruction generated by the second remote controller, thereby increasing the effective distance for controlling the control object by the second remote controller and achieving the effect of remotely controlling the control object.

On the basis of the preceding embodiments, optionally, the first smart device is connected to the first remote controller via Bluetooth.

In an embodiment, the Bluetooth module of the first remote controller is set to be in an on state by default when the first remote controller leaves the factory. When the local person requires the remote person to control the control object, the local person may turn on the Bluetooth function of the first smart device, and when the first smart device searches for the Bluetooth signal of the first remote controller, the Bluetooth connection between the first remote controller and the first smart device is established.

The first smart device is connected to the first remote controller via Bluetooth. Because the Bluetooth communication has the characteristic of high stability, the first remote controller can receive the remote control instruction in time, thereby reducing the time delay for controlling the control object.

Figure 3:
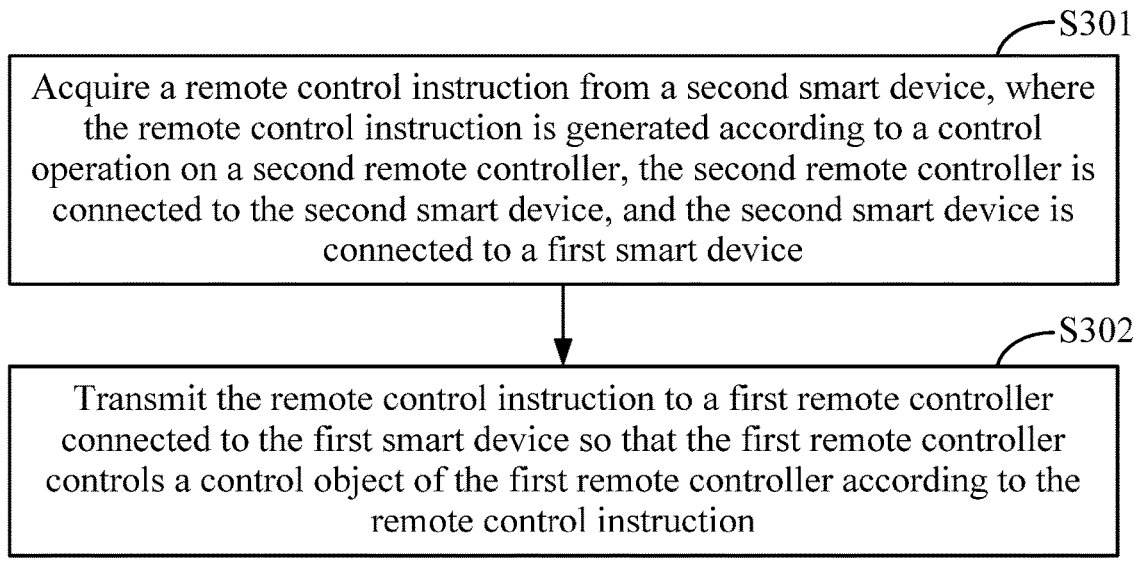
FIG. 3 is a flowchart of another remote control method according to an embodiment of the present disclosure.

FIG. 3 is a flowchart of another remote control method according to an embodiment of the present disclosure. This embodiment is applicable to the case of remotely controlling a control object. The method in this embodiment may be performed by a remote control apparatus provided by an embodiment of the present disclosure. The apparatus may be configured in a first smart device, implemented by software and/or hardware and integrated into any electronic device having a computing capability.

As shown in FIG. 3, the remote control method provided in this embodiment may include steps S301 and S302.

In S301, a remote control instruction is acquired from a second smart device, where the remote control instruction is generated according to a control operation on a second remote controller, the second remote controller is connected to the second smart device, and the second smart device is connected to a first smart device.

The first smart device and the second smart device represent terminal devices equipped with a smart operating system, such as smartphones, smartwatches, smart bracelets, smart tablets and the like. The first smart device and the second smart device may have the same type, and for example, the first smart device and the second smart device are both smartphones. The first smart device and the second smart device may have different types, and for example, the first smart device is a smartphone while the second smart device is a smartwatch. The specific types of the first smart device and the second smart device are not limited to this embodiment. The first smart device is in a communication connection with the second smart device, and for example, the first smart device and the second smart device perform wireless communication through a Wi-Fi network, a 4G network or a 5G network. The first smart device is disposed on a side close to the control object, and for example, when the control object is an appliance device, the first smart device may be a smart device held by the user who owns the appliance device. The second smart device is disposed on a side away from the control object, and for example, when the control object is an appliance device, the second smart device may be a smart device held by the maintenance personnel of the appliance device manufacturer.

Both the first remote controller and the second remote controller are equipped with a communication module and a processing module and have functions for data communication and data processing. The first remote controller is in a communication connection with the first smart device, and the second remote controller is in a communication connection with the second smart device. The first remote controller is disposed on a side close to the control object, and for example, when the control object is an appliance device, the first remote controller may be a remote controller held by the user who owns the appliance device. The second remote controller is disposed on a side away from the control object, and for example, when the control object is an appliance device, the second remote controller may be a remote controller held by the maintenance personnel of the appliance device manufacturer.

In an embodiment, a remote control application is installed in both the first smart device and the second smart device in advance. After the local person turns on the remote control application in the first smart device, a server of the remote control application generates a machine code and a password for remote control and distributes the machine code and the password to the first smart device. The local person informs the remote person of the machine code and password displayed in the first smart device, for example, by telephone or short message. The remote person turns on the remote control application in the second smart device, input the acquired machine code and password in the interface, and send the machine code and password to the server for verification. The server verifies the consistency between the machine code and password sent by the second smart device and the machine code and password distributed to the first smart device, and if the machine code and password sent by the second smart device are consistent with the machine code and password distributed to the first smart device, establishes the communication connection between the first smart device and the second smart device through the server. That is, the communication connection relationship of "first smart device-server-second smart device" is established.

The second remote controller generates a remote control instruction including a target instruction type according to the control operation of the remote personnel. For example, when the control operation is a touch operation, the second remote controller generates a target instruction type corresponding to the button touched by the remote person according to the touched button and generates a remote control instruction including the target instruction type. For example, if the remote person touches the "Volume +" button, the target instruction type generated by the second remote controller is the "volume increase instruction". In another example, when the control operation is a speech operation, the second remote controller performs semantic recognition on a speech instruction issued by the remote personnel, determines the control intention of the remote personnel, determines a target instruction type according to the control intention, and generates a remote control instruction including the target instruction type. For example, if the speech instruction of the remote person is "confirm", the target instruction type generated by the second remote controller is the "confirmation instruction".

The second remote controller transmits the remote control instruction to the second smart device, the second smart device transmits the remote control instruction to the server based on the communication connection relationship established between the second smart device and the first smart device, and the server forwards the remote control instruction to the first smart device.

The remote control instruction is acquired from the second smart device, laying a data foundation for the subsequent operation that the first smart device forwards the remote control instruction to the first remote controller.

In S302, the remote control instruction is transmitted to a first remote controller connected to the first smart device so that the first remote controller controls a control object of the first remote controller according to the remote control instruction.

The control object may be any electronic device having a data receiving function and a data processing function, such as a television, an air conditioner, a washing machine and other appliance devices. The specific type of the control object is not limited to this embodiment.

In an embodiment, the first smart device transmits the remote control instruction to the first remote controller, and the first remote controller parses the acquired remote control instruction, determines the target instruction type included in the remote control instruction, generates a control instruction according to the target instruction type, and transmits the control instruction to the control object. The control object receives the control instruction, recognizes the control instruction, and executes the control operation corresponding to the target instruction type according to the recognition result. For example, when the target instruction type is the "volume increase instruction", the control object increases the volume of the audio played by the speaker. In another example, when the target instruction type is the "next page instruction", the control object performs the operation of jumping to the next page on the screen.

In the present disclosure, the remote control instruction is acquired from the second smart device, where the remote control instruction is generated according to the control operation on the second remote controller, the second remote controller is connected to the second smart device, and the second smart device is connected to the first smart device; and the remote control instruction is transmitted to the first remote controller connected to the first smart device so that the first remote controller controls the control object of the first remote controller according to the remote control instruction, thereby increasing the effective distance for controlling the control object and achieving the effect of remotely controlling the control object. Further, since the remote person can directly control the control object, there is no need to guide the local person to control the control object by means of video or speech, thereby greatly improving the efficiency of controlling the control object.

On the basis of the preceding embodiments, optionally, the method further includes the steps described below.

Video information of the control object is collected, and the video information is transmitted to the second smart device so that the second smart device generates video pictures according to the video information.

In an embodiment, in the process of remote control, the local person controls the first smart device to perform video collection on the control object in real time to generate video information, the first smart device sends the collected video information to the server, and the server forwards the video information to the second smart device. After the second smart device acquires the video information, the second smart device renders the video information to generate video pictures, and the remote person can determine what kind of control operation is to be performed on the second remote controller according to the video pictures.

The video information of the control object is collected and transmitted to the second smart device so that the second smart device generates the video pictures according to the video information. In this manner, the remote person can watch the real-time picture of the control object, thereby assisting the remote person in performing the control operation on the second remote controller and improving the accuracy of controlling the control object.

On the basis of the preceding embodiments, optionally, the method further includes the steps described below.

Audio information of the control object is collected, and the audio information is transmitted to the second smart device so that the second smart device plays audio according to the audio information.

In an embodiment, in the process of remote control, the local person controls the first smart device to perform audio collection on the control object in real time to generate audio information, the first smart device sends the collected audio information to the server, and the server forwards the audio information to the second smart device. After the second smart device acquires the audio information, the second smart device parses the audio information to play audio, and the remote person can determine what kind of control operation is to be performed on the second remote controller according to the listened audio.

Optionally, in addition to the audio information of the control object, the audio information may further include audio information of the local personnel. That is, the local person can reflect the questions to the remote person about the control of the control object by means of speech.

The audio information of the control object is collected and transmitted to the second smart device so that the second smart device plays the audio according to the audio information. In this manner, the remote person can listen to the audio issued by the control object, thereby assisting the remote person in performing the control operation on the second remote controller and improving the accuracy of controlling the control object.

Optionally, the second smart device is connected to the second remote controller via Bluetooth.

In an embodiment, the Bluetooth module of the second remote controller is set to be in an on state by default when the second remote controller leaves the factory. When the local person requires the remote person to control the control object, the remote person may turn on the Bluetooth function of the second smart device, and when the second smart device searches for the Bluetooth signal of the second remote controller, the Bluetooth connection between the second remote controller and the second smart device is established.

The second smart device is connected to the second remote controller via Bluetooth. Because the Bluetooth communication has the characteristic of high stability, the second smart device can send the remote control instruction in time, thereby reducing the time delay for controlling the control object.

On the basis of the preceding embodiments, optionally, the second remote controller is set to be a virtual remote controller in the second smart device.

Specifically, the virtual remote controller is displayed on the interface of the second smart device and has the same keys as the second remote controller. The remote person can directly control the virtual remote controller on the second smart device, and the second smart device generates a remote control instruction including a target instruction type according to the control operation of the remote person on the virtual remote controller. The second smart device transmits the remote control instruction to the first smart device, and the first smart device further transmits the remote control instruction to the first remote controller.

Optionally, in the second smart device, the display interface of the virtual remote controller is suspended on the video picture of the control object and is in a semitransparent state, thereby avoiding the problem that the display interface of the virtual remote controller blocks the video picture of the control object.

The second remote controller is set to be a virtual remote controller in the second smart device so that no physical remote controller needs to be separately provided for the remote personnel, thereby saving the material cost on the premise that the control object can be remotely controlled.

Figure 4:
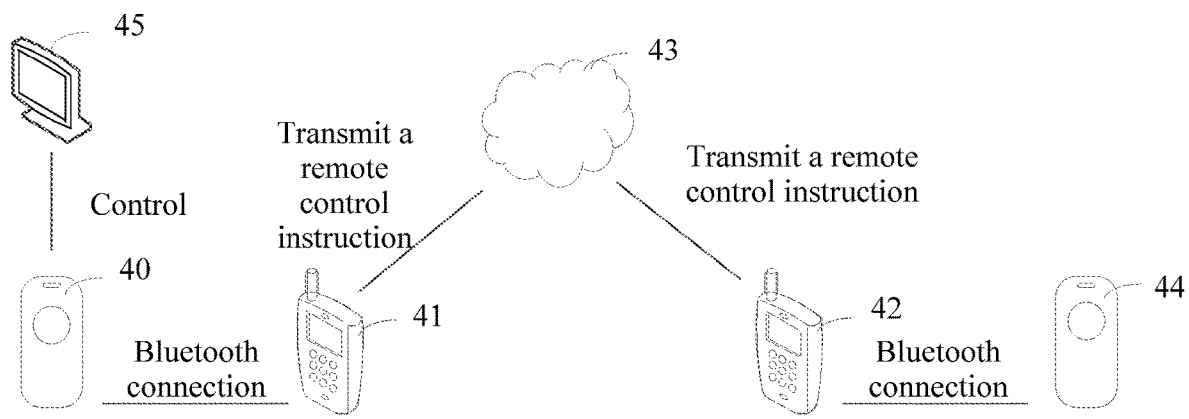
FIG. 4 is a schematic diagram of a remote control scenario according to an embodiment of the present disclosure.

FIG. 4 is a schematic diagram of a remote control scenario according to an embodiment of the present disclosure. As shown in FIG. 4, the first remote controller 40 is connected to the first smart device 41 via Bluetooth, the first smart device 41 is connected to the second smart device 42 through the server 43, and the second smart device 42 is connected to the second remote controller 44 via Bluetooth.

The remote user performs a control operation on the second remote controller 44. The second remote controller 44 generates a remote control instruction and transmits the remote control instruction to the second smart device 42. The second smart device 42 transmits the remote control instruction to the server 43. The server 43 transmits the remote control instruction to the first smart device 41. Finally, the first smart device 41 transmits the remote control instruction to the first remote controller 40 so that the first remote controller 40 controls the control object 45 according to the remote control instruction.

FIG. 4 illustrates the overall flow of the remote control in this embodiment and does not limit the specific implementation of each step. For the specific implementation of the steps, reference may be made to the description in the preceding method embodiments of the present disclosure, and details will not be repeated herein.

Figure 5:
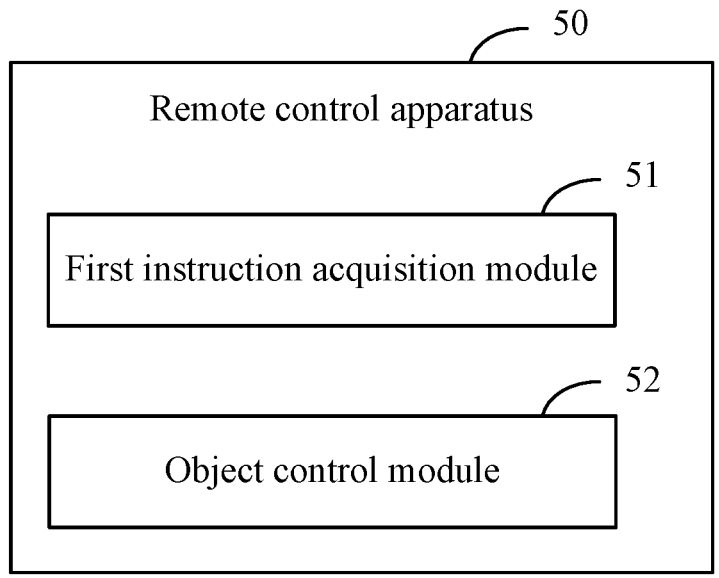
FIG. 5 is a structure diagram of a remote control apparatus according to an embodiment of the present disclosure.

FIG. 5 is a structure diagram of a remote control apparatus according to an embodiment of the present disclosure. This apparatus is configured in a first remote controller and is applicable to the case of remotely controlling a control object. The apparatus in this embodiment may be implemented by software and/or hardware and integrated into any electronic device having a computing capability.

As shown in FIG. 5, the remote control apparatus 50 provided in this embodiment may include a first instruction acquisition module 51 and an object control module 52.

The first instruction acquisition module 51 is configured to acquire a remote control instruction from a first smart device, where the remote control instruction is generated according to a control operation on a second remote controller and transmitted to the first smart device through a second smart device, and the first smart device is connected to a first remote controller.

The object control module 52 is configured to control a control object of the first remote controller according to the remote control instruction.

Optionally, the object control module 52 is specifically configured to: parse the remote control instruction, and acquire a target instruction type included in the remote control instruction; and generate a speech control instruction according to the target instruction type, and play the speech control instruction to the control object of the first remote controller to control the control object according to the speech control instruction.

Optionally, the object control module 52 is specifically configured to: parse the remote control instruction, and acquire a target instruction type included in the remote control instruction; match the target instruction type with a candidate instruction type, and determine a target coding sequence according to a matching result; and send the target coding sequence to the control object of the first remote controller so as to control the control object according to the target coding sequence.

Optionally, the object control module 52 is further specifically configured to: determine the candidate instruction type matching the target instruction type, and take a candidate coding sequence associated with the candidate instruction type as the target coding sequence.

Optionally, the object control module 52 is further specifically configured to: send the target coding sequence to the control object using at least one of the following transmission manners: an infrared transmission manner, a Bluetooth transmission manner, an ultrasonic transmission manner, a Wireless Fidelity transmission manner or a mobile network transmission manner.

Optionally, the first smart device is connected to the first remote controller via Bluetooth.

The remote control apparatus 50 provided in this embodiment of the present disclosure can perform a remote control method provided in the embodiments of the present disclosure and has functional modules and beneficial effects corresponding to the performed method. For content not described in detail in this embodiment, reference may be made to the description in any method embodiment of the present disclosure.

Figure 6:
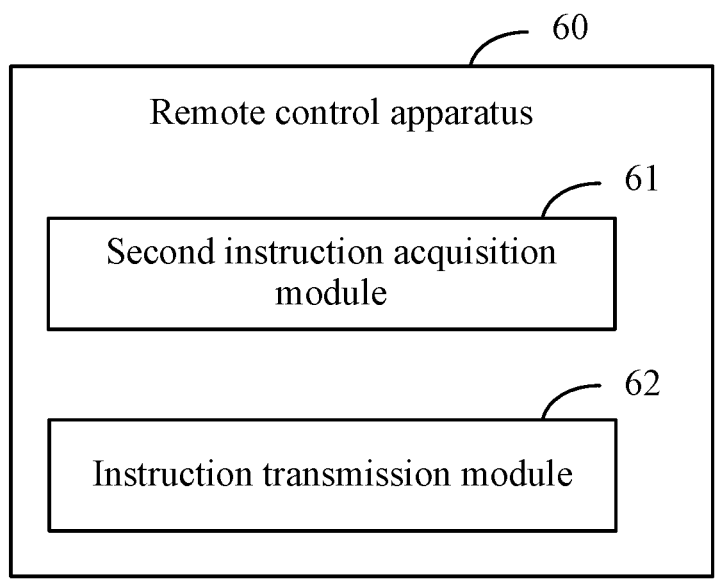
FIG. 6 is a structure diagram of a remote control apparatus according to an embodiment of the present disclosure.

FIG. 6 is a structure diagram of a remote control apparatus according to an embodiment of the present disclosure. This apparatus is configured in a first smart device and is applicable to the case of remotely controlling a control object. The apparatus in this embodiment may be implemented by software and/or hardware and integrated into any electronic device having a computing capability.

As shown in FIG. 6, the remote control apparatus 60 provided in this embodiment may include a second instruction acquisition module 61 and an instruction transmission module 62.

The second instruction acquisition module 61 is configured to acquire a remote control instruction from a second smart device, where the remote control instruction is generated according to a control operation on a second remote controller, the second remote controller is connected to the second smart device, and the second smart device is connected to a first smart device.

The instruction transmission module 62 is configured to transmit the remote control instruction to a first remote controller connected to the first smart device so that the first remote controller controls a control object of the first remote controller according to the remote control instruction.

Optionally, the apparatus further includes a video collection module.

The video collection module is specifically configured to collect video information of the control object and transmit the video information to the second smart device so that the second smart device generates video pictures according to the video information.

Optionally, the apparatus further includes an audio collection module.

The audio collection module is specifically configured to collect audio information of the control object and transmit the audio information to the second smart device so that the second smart device plays audio according to the audio information.

Optionally, the second smart device is connected to the second remote controller via Bluetooth.

The remote control apparatus 60 provided in this embodiment of the present disclosure can perform a remote control method provided in the embodiments of the present disclosure and has functional modules and beneficial effects corresponding to the performed method. For content not described in detail in this embodiment, reference may be made to the description in any method embodiment of the present disclosure.

Operations, including acquisition, storage, and application, on a user's personal information involved in the solution of the present disclosure conform to relevant laws and regulations and do not violate the public policy doctrine.

According to an embodiment of the present disclosure, the present disclosure further provides an electronic device, a readable storage medium and a computer program product.

Figure 7:
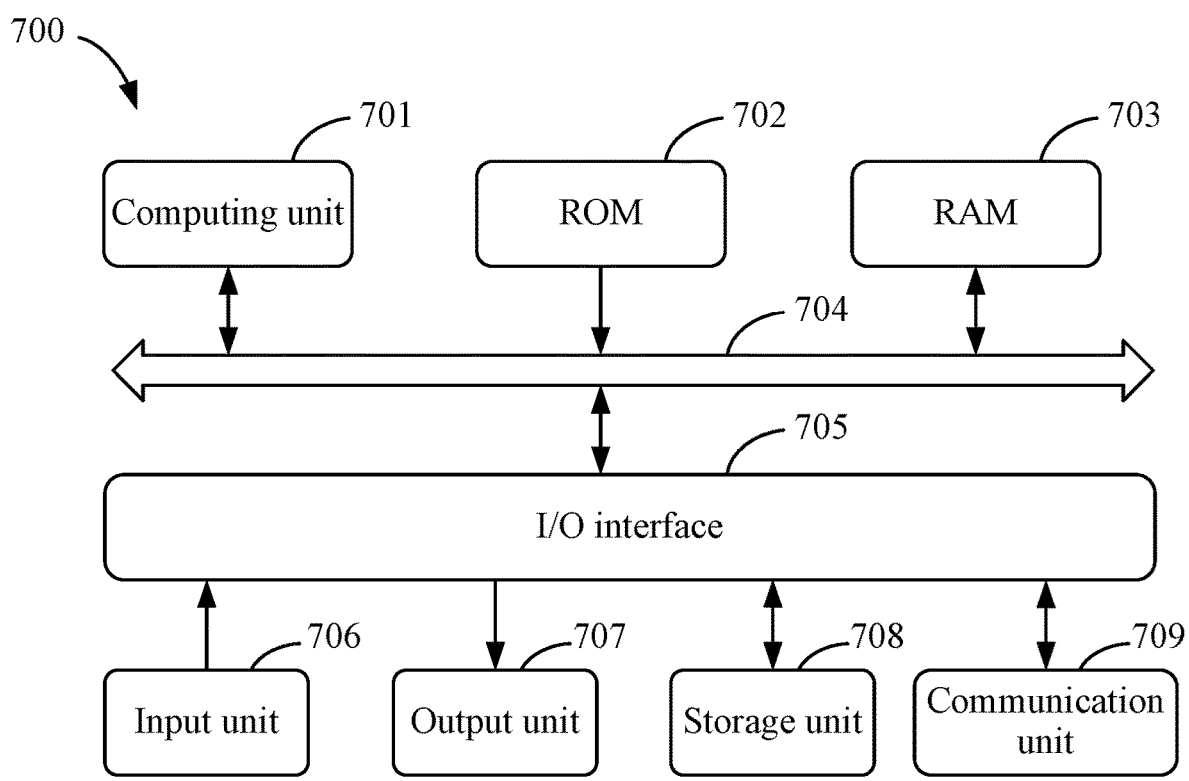
FIG. 7 is a block diagram of an electronic device for implementing a remote control method according to an embodiment of the present disclosure.

FIG. 7 is an example block diagram of an example electronic device 700 that may be used for performing the embodiments of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions for these components are illustrative only and are not intended to limit the implementation of the present disclosure as described and/or claimed herein.

As shown in FIG. 7, the device 700 includes a computing unit 701. The computing unit 701 may perform various types of appropriate operations and processing based on a computer program stored in a read-only memory (ROM) 702 or a computer program loaded from a storage unit 708 to a random-access memory (RAM) 703. Various programs and data required for the operation of the device 700 may also be stored in the RAM 703. The computing unit 701, the ROM 702 and the RAM 703 are connected to each other via a bus 704. An input/output (I/O) interface 705 is also connected to the bus 704.

Multiple components in the device 700 are connected to the I/O interface 705. The multiple components include an input unit 706 such as a keyboard or a mouse, an output unit 707 such as various types of displays or speakers, the storage unit 708 such as a magnetic disk or an optical disc, and a communication unit 709 such as a network card, a modem or a wireless communication transceiver. The communication unit 709 allows the device 700 to exchange information/data with other devices over a computer network such as the Internet and/or various telecommunications networks.

The computing unit 701 may be various general-purpose and/or special-purpose processing components having processing and computing capabilities. Some examples of the computing unit 701 include, but are not limited to, central processing units (CPUs), graphics processing units (GPUs), various special-purpose artificial intelligence (AI) computing chips, various computing units running machine learning models and algorithms, digital signal processors (DSPs), and any suitable processors, controllers and microcontrollers. The computing unit 701 performs various methods and processing described above, such as the remote control method. For example, in some embodiments, the remote control method may be implemented as a computer software program tangibly contained in a machine-readable medium such as the storage unit 708. In some embodiments, part or all of computer programs may be loaded and/or installed on the device 700 via the ROM 702 and/or the communication unit 709. When the computer program is loaded to the RAM 703 and executed by the computing unit 701, one or more steps of the preceding remote control method may be performed. Alternatively, in other embodiments, the computing unit 701 may be configured, in any other suitable manner (for example, by means of firmware), to perform the remote control method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for implementation of the methods of the present disclosure may be written in one programming language or any combination of multiple programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed entirely on a machine or may be executed partly on a machine. As a stand-alone software package, the program codes may be executed partly on a machine and partly on a remote machine or may be executed entirely on a remote machine or a server.

In the context of the present disclosure, the machine-readable medium may be a tangible medium that may include or store a program for use by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM, or a flash memory), an optical fiber, a portable compact disk read-only memory (CD-ROM), an optical memory device, a magnetic memory device, or any suitable combination thereof.

In order to provide the interaction with a user, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

A computing system may include a client and a server. The client and the server are usually far away from each other and generally interact through the communication network. The relationship between the client and the server arises by virtue of computer programs running on respective computers and having a client-server relationship with each other. The server may be a cloud server, also referred to as a cloud computing server or a cloud host. As a host product in a cloud computing service system, the server solves the defects of difficult management and weak service scalability in a related physical host and a related virtual private server (VPS) service.

It is to be understood that various forms of the preceding flows may be used with steps reordered, added, or removed. For example, the steps described in the present disclosure may be executed in parallel, in sequence or in a different order as long as the desired results of the technical solutions disclosed in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure falls within the scope of the present disclosure.

What is claimed is:

1. A remote control method, comprising:
    acquiring a remote control instruction from a first smart device, wherein the remote control instruction is generated according to a control operation on a second remote controller and transmitted to the first smart device through a second smart device, and the first smart device is connected to a first remote controller; and
    controlling a control object of the first remote controller according to the remote control instruction;
    wherein the controlling a control object of the first remote controller according to the remote control instruction comprises:
    parsing the remote control instruction, and acquiring a target instruction type comprised in the remote control instruction; and
    generating a speech control instruction according to the target instruction type, and playing the speech control instruction to the control object of the first remote controller to control the control object according to the speech control instruction.

2. The method according to claim 1, wherein the first smart device is connected to the first remote controller via Bluetooth.

3. An electronic device, comprising:

at least one processor; and a memory communicatively connected to the at least one processor;

the memory stores instructions executable by the at least one processor, wherein the instructions are executed by the at least one processor to enable the at least one processor to perform the following steps:

acquiring a remote control instruction from a first smart device, wherein the remote control instruction is generated according to a control operation on a second remote controller and transmitted to the first smart device through a second smart device, and the first smart device is connected to a first remote controller; and controlling a control object of the first remote controller according to the remote control instruction;

wherein the controlling a control object of the first remote controller according to the remote control instruction comprises:

parsing the remote control instruction, and acquiring a target instruction type comprised in the remote control instruction; and generating a speech control instruction according to the target instruction type, and playing the speech control instruction to the control object of the first remote controller to control the control object according to the speech control instruction.

4. A non-transitory computer-readable storage medium storing computer instructions, wherein the computer instructions are used for enabling a computer to perform following steps:

acquiring a remote control instruction from a first smart device, wherein the remote control instruction is generated according to a control operation on a second remote controller and transmitted to the first smart device through a second smart device, and the first smart device is connected to a first remote controller; and controlling a control object of the first remote controller according to the remote control instruction;

wherein the controlling a control object of the first remote controller according to the remote control instruction comprises:

parsing the remote control instruction, and acquiring a target instruction type comprised in the remote control instruction; and generating a speech control instruction according to the target instruction type, and playing the speech control instruction to the control object of the first remote controller to control the control object according to the speech control instruction.

* * * * *